United States Patent
Sanderson et al.

(10) Patent No.: US 11,319,832 B2
(45) Date of Patent: May 3, 2022

(54) SINGLE MOVEMENT CONVERGENT AND CONVERGENT-DIVERGENT NOZZLE

(71) Applicant: Rolls-Royce North American Technologies Inc., Indianapolis, IN (US)

(72) Inventors: Andrew Sanderson, Indianapolis, IN (US); David L. Sutterfield, Greenwood, IN (US); Bryan H. Lerg, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 150 days.

(21) Appl. No.: 16/803,528

(22) Filed: Feb. 27, 2020

(65) Prior Publication Data
US 2021/0270145 A1    Sep. 2, 2021

(51) Int. Cl.
*F01D 17/16* (2006.01)
*F02K 1/08* (2006.01)

(52) U.S. Cl.
CPC ............. *F01D 17/167* (2013.01); *F02K 1/08* (2013.01); *F05D 2240/1281* (2013.01)

(58) Field of Classification Search
CPC .................................... F02K 1/08; F02K 1/09
See application file for complete search history.

(56) References Cited

U.S. PATENT DOCUMENTS

| | | | |
|---|---|---|---|
| 3,289,946 A * | 12/1966 | Lennard | F02K 1/1261 239/265.39 |
| 3,352,494 A | 11/1967 | Colville et al. | |
| 3,390,837 A * | 7/1968 | Freeman | F02K 1/08 239/265.17 |
| 4,043,508 A | 8/1977 | Speir et al. | |
| 4,802,629 A * | 2/1989 | Klees | F02K 1/625 239/265.19 |
| 6,983,588 B2 | 1/2006 | Lair | |
| 7,174,704 B2 | 2/2007 | Renggli | |
| 7,178,338 B2 | 2/2007 | Whurr | |
| 8,091,334 B2 | 1/2012 | Moniz et al. | |
| 8,443,931 B2 | 5/2013 | Pilon | |
| 8,459,036 B2 | 6/2013 | Baker | |
| 2010/0095650 A1 | 4/2010 | Schafer | |
| 2011/0302907 A1* | 12/2011 | Murphy | F02K 1/15 60/226.3 |
| 2015/0121841 A1* | 5/2015 | Izquierdo | F02K 3/075 60/204 |
| 2016/0123178 A1* | 5/2016 | Tersmette | F02K 1/08 239/11 |

FOREIGN PATENT DOCUMENTS

WO     2005065071 A2    7/2005

* cited by examiner

*Primary Examiner* — Craig Kim
(74) *Attorney, Agent, or Firm* — Barnes & Thornburg LLP (57) ABSTRACT

A variable exhaust nozzle for use with a gas turbine engine includes an outer shroud and an inner plug that can move relative to the outer shroud. The relative movement of the inner plug and the outer shroud changes the shape of the variable exhaust nozzle from one that converges in area to one that converges and then diverges in area.

20 Claims, 5 Drawing Sheets

SINGLE MOVEMENT CONVERGENT AND CONVERGENT-DIVERGENT NOZZLE

FIELD OF THE DISCLOSURE

The present disclosure relates generally to assemblies for aircraft engines such as gas turbine engines, and more specifically to exhaust nozzles for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine into the exhaust nozzle where they are directed away from the engine.

Exhaust nozzles can have size and shape to optimize engine operation. A larger exhaust nozzle throat area can increase mass flow of the exhaust air, reduce overall velocity of the exhaust air, and lower noise emissions of the engine by lowering the operation line of the engine. The shape of the exhaust nozzle can optimize the exhaust flow exiting the engine to increase engine efficiency and provide some thrust. In some applications, the exhaust nozzle mixes the hot exhaust air from the turbine with cooler by-pass duct air.

Subsonic exhaust nozzles typically have a convergent shape which causes expansion of the gases to atmospheric pressure downstream of the exhaust nozzle. This creates some thrust from the imbalance of the static pressure at the throat of the exhaust and the atmospheric pressure. Supersonic exhausts may have a convergent-divergent shape to generate supersonic flow of the exhaust gases. The convergent section of the exhaust nozzle may be sized to choke the flow so that the flow is sonic at the throat. The divergent section of the exhaust nozzle may allow further expansion of the gases inside the nozzle and accelerates the flow to supersonic.

SUMMARY

The present disclosure may comprise one or more of the following features and combinations thereof.

A variable exhaust nozzle for a gas turbine engine, the variable exhaust nozzle may comprise of an outer shroud, an inner plug, and a variable area region. The outer shroud may be arranged circumferentially about an axis to define an outer boundary surface of an exhaust nozzle flow path. The outer shroud may extend axially between a forward axial location and a terminal shroud end. The outer boundary surface may decrease in diameter as the outer shroud extends axially aft from the forward axial location to the terminal shroud end. The inner plug may be arranged circumferentially about the axis to define an inner boundary surface of the exhaust nozzle flow path. The inner plug may extend axially between a nose and a terminal tail end. The inner boundary surface may increase in diameter and then decreases in diameter as the inner plug extends axially aft from the nose to the terminal tail end.

The variable area region of the exhaust nozzle flow path may be defined axially between the nose of the inner plug and the terminal shroud end. The variable area region may also be defined radially between the outer boundary surface and the inner boundary surface. One of the outer shroud and the inner plug may be configured to translate axially relative to the other. The outer shroud and the inner plug may translate between an open position and a closed position. In some embodiments, the inner plug may be generally droplet shaped.

The open position may be defined by the outer boundary surface and the inner boundary surface cooperating to cause the variable area region of the exhaust nozzle flow path to converge in area to a first throat located at the terminal shroud end without diverging. The closed position may be defined by the outer boundary surface and the inner boundary surface cooperating to cause the variable area region of the exhaust nozzle flow path to converge in area to a second throat and then diverge in area aft of the second throat. The second throat may be spaced apart axially from the nose of the inner plug and the terminal shroud end.

In some embodiments, the terminal tail end may be located axially aft of the terminal shroud end when the one of the outer shroud and the inner plug is in the open position. In another embodiment, the nose of the inner plug is located axially forward of the terminal shroud end when the one of the outer shroud and the inner plug is in both the open position and the closed position.

In further embodiments, a minimum area of the variable area region in the open position may be greater than a minimum area of the variable area region in the closed position. In some embodiments, the variable area region of the exhaust nozzle flow path may diverge in area aft of the second throat without converging in area aft of the second throat.

In another embodiment, the one of the outer shroud and the inner plug may be movable relative to the axis between a plurality of positions between the open position and the closed position. The variable exhaust nozzle may further comprise an actuation controller configured to selectively move the one of the outer shroud and the inner plug. The actuation controller may stop and hold the one of the outer shroud and the inner plug relative to the axis in the open position, the closed position, and at least one of the plurality of positions.

In a further embodiment, the one of the outer shroud and the inner plug may be configured to default to one of the open position and the closed position in response to failure of the actuation controller. In some embodiments, the actuation controller may be configured to receive a first input indicative that the gas turbine engine is in a take-off mode. The actuation controller may move the one of the outer shroud and the inner plug to the open position in response to receiving the first input. The actuation controller may be configured to receive a second input indicative that the gas turbine engine is in a cruise mode. The actuation controller may move the one of the outer shroud and the inner plug to the closed position in response to receiving the second input.

According to a further aspect of the present disclosure, a variable exhaust nozzle may comprise of an outer shroud and an inner plug. The outer shroud may be arranged circumferentially about an axis, the outer shroud having a terminal shroud end. The inner plug may be arranged circumferentially about the axis and may extend axially between a nose and a tail. The inner plug and the outer shroud may cooperate to form an exhaust nozzle flow path having a variable area region.

The variable area region may be defined axially between the nose of the inner plug and the terminal shroud end of the outer shroud. At least one of the outer shroud and the inner plug may be movable relative to the axis between a first position, a second position, and a plurality of positions. The variable area region of the first position may converge in area. The variable area region of the second position may converge and then diverge in area. The variable area region of the plurality of positions may be between the first position and the second position. In a further embodiment, a minimum area of the variable area region in the first position may be greater than a minimum area of the variable area region in the second position.

In some embodiments, the at least one of the outer shroud and the inner plug may be movable relative to the axis between the plurality of positions between the first position and the second position. The variable exhaust nozzle may further comprise of an actuation controller configured to selectively move the at least one of the outer shroud and the inner plug. The actuation controller may stop and hold the at least one of the outer shroud and the inner plug relative to the axis. In another embodiment, the at least one of the outer shroud and the inner plug may be configured to default to one of the first position and the second position in response to failure of the actuation controller.

In a further embodiment, the outer shroud may define an outer boundary surface of the exhaust nozzle flow path. The outer shroud may extend axially between a forward axial location and a terminal shroud end. The outer boundary surface may decrease in diameter as the outer shroud extends axially aft from the forward axial location to the terminal shroud end.

In another embodiment, the inner plug may be arranged circumferentially about the axis to define an inner boundary surface of the exhaust nozzle flow path. The inner plug may extend axially between a nose and a terminal tail end. The inner boundary surface may increase in diameter and then decrease in diameter as the inner plug extends axially aft from the nose to the terminal tail end. In a further embodiment, the inner plug is generally droplet shaped.

In some embodiments, an actuation controller may be configured to move the at least one of the outer shroud and the inner plug. The actuation controller may be further configured to receive a first input indicative that a gas turbine engine is in a take-off mode. The actuation controller may move the at least one of the outer shroud and the inner plug to the first position in response to receiving the first input. The actuation controller may be further configured to receive a second input indicative that the gas turbine engine is in a cruise mode. The actuation controller may move the at least one of the outer shroud and the inner plug to the second position in response to receiving the second input.

According to another aspect of the present disclosure, a method may provide an inner plug and an outer shroud. The inner plug may be arranged circumferentially about an axis. The outer shroud may be arranged circumferentially about the inner plug. The outer shroud may have a terminal shroud end. The inner plug may extend axially between a nose and a tail. The inner plug and the outer shroud may cooperate to form an exhaust nozzle flow path having a variable area region. The variable area region may be defined axially between the nose of the inner plug and the terminal shroud end of the outer shroud. The method may move at least one of the outer shroud and the inner plug relative to the axis to a first position in which the variable area region converges in area. The method may also move at least one of the outer shroud and the inner plug relative to the axis to a second position in which the variable area region converges and then diverges in area.

In another embodiment, the method may provide an actuator controller configured to move the at least one of the outer shroud and the inner plug relative to the axis between the first position and the second position. The method may move the at least one of the outer shroud and the inner plug relative to the axis to one of the first position and the second position in response to a failure of the actuator controller.

In some embodiments, the method may provide an actuator controller configured to move the at least one of the outer shroud and the inner plug relative to the axis between the first position and the second position. The method may receive a first input with the actuator controller indicative of a take-off mode of a gas turbine engine. The method may move the at least one of the outer shroud and the inner plug relative to the axis to the first position in response to receiving the first input. The method may receive a second input with the actuator controller indicative of a cruise mode of the gas turbine engine. The method may move the at least one of the outer shroud and the inner plug relative to the axis to the second position in response to receiving the second input.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
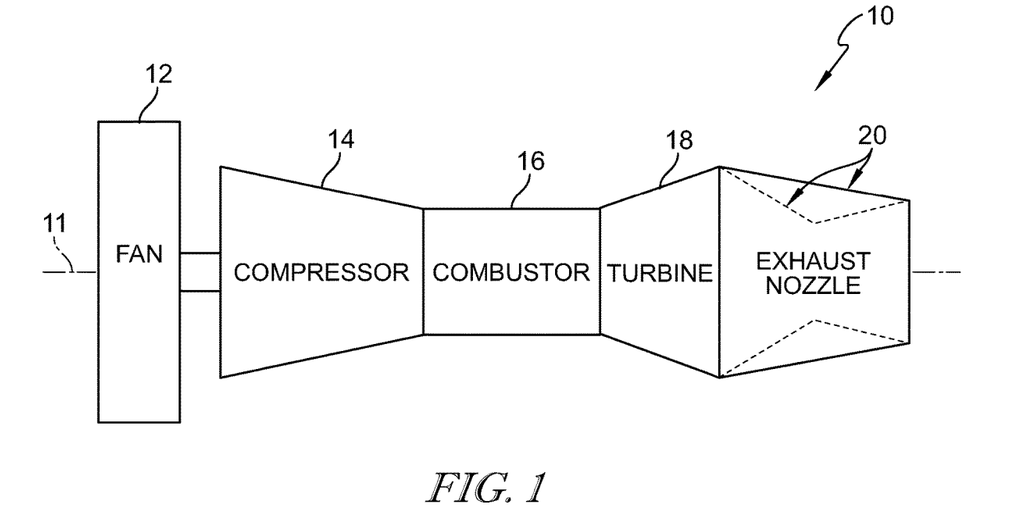
FIG. 1 is a diagrammatic view of a gas turbine engine that includes a fan, a compressor, a combustor, a turbine, and an exhaust nozzle, the exhaust nozzle is illustratively shown in a convergent shape to reduce noise, for example, at take-off and landing, and suggesting with dotted lines that the exhaust nozzle is movable selectively to a convergent-divergent shape to improve efficiency of the engine at cruise.

An aerospace gas turbine engine 10 includes a fan 12, a compressor 14, a combustor 16, a turbine 18, and a variable exhaust nozzle 20 as shown in FIG. 1. The variable exhaust nozzle 20 is movable selectively between a convergent shape and a convergent-divergent shape as suggested in FIGS. 1 and 2. The shape of the variable exhaust nozzle 20 can be changed to optimize the flow for low noise emissions such as, for example, during take-off and landing, or for increased engine efficiency, for example, at cruise. In some embodiments, the variable exhaust nozzle 20 includes a controller 26 configured to move the variable exhaust nozzle 20 between certain configurations quickly and/or to block the variable exhaust nozzle 20 from dwelling at the certain configurations to avoid aerodynamic buzz and damage to the nozzle 20.

The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. The exhaust products of the turbine 18 are directed into the variable exhaust nozzle 20. The shape of the variable exhaust nozzle 20 can be changed to the convergent shape to optimize the flow for low noise emissions or to the convergent-divergent shape for increased engine efficiency.

Figure 2:
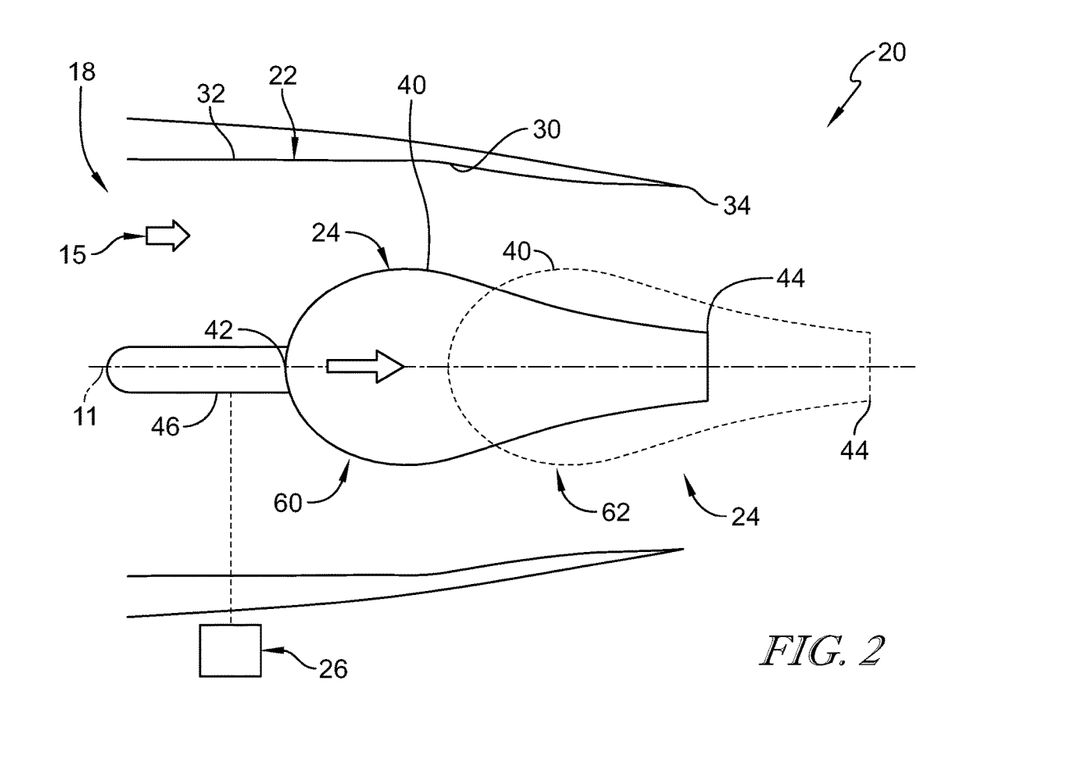
FIG. 2 is a diagrammatic and cross-sectional view of the exhaust nozzle included in the gas turbine engine of FIG. 1 showing that the exhaust nozzle includes an outer shroud and an inner plug and suggesting that the inner plug is configured to move from an axially forward open position relative to the outer shroud in which a flow path of the exhaust nozzle is convergent, to an axially aft closed position in which the flow path of the exhaust nozzle is convergent and divergent.
Figure 3:
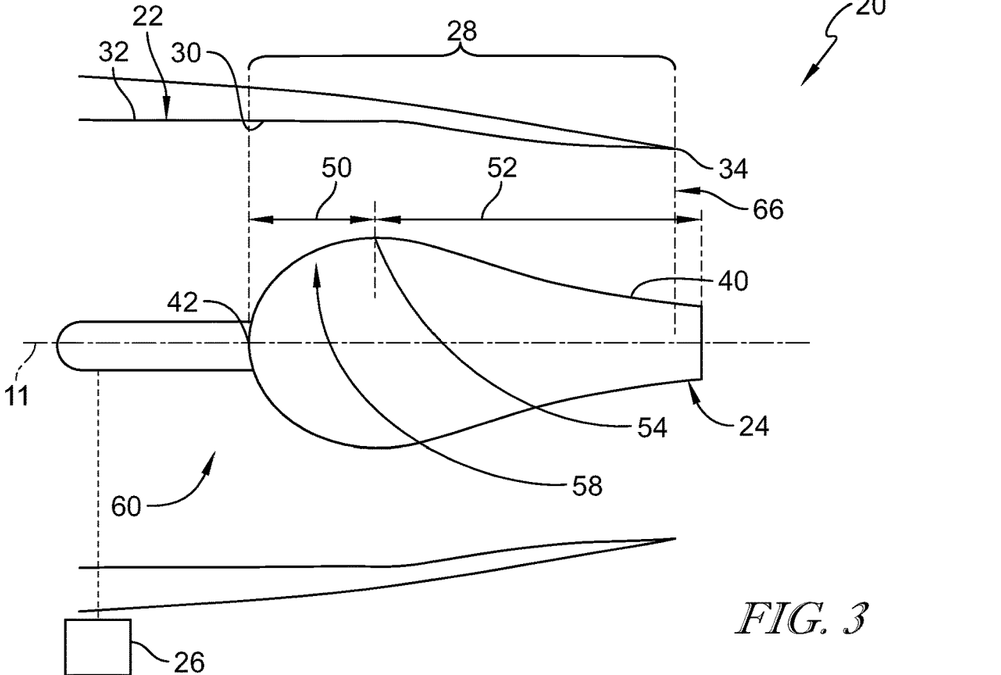
FIG. 3 is a diagrammatic and cross-sectional view of the exhaust nozzle of FIG. 2 showing the inner plug in the axially forward open position and suggesting that a variable area region of the flow path of the exhaust nozzle is defined between a nose of the inner plug and a terminal shroud end of the outer shroud, and further showing that the variable area region has a convergent shape when the inner plug is in the open position to reduce noise generated by the gas turbine engine.
Figure 4:
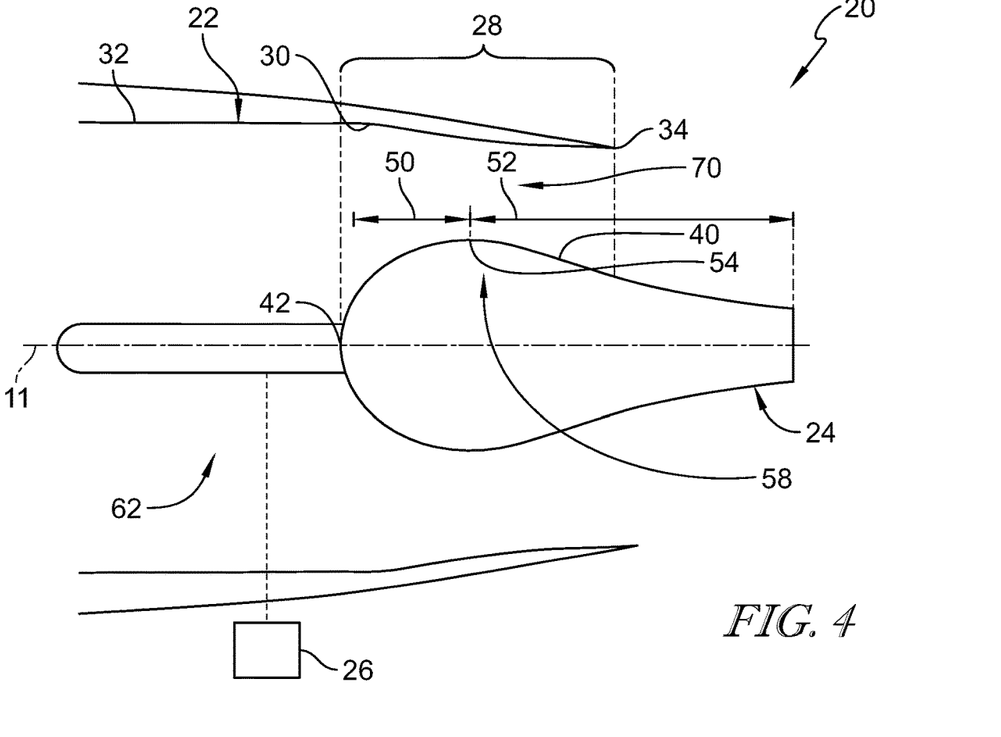
FIG. 4 is a diagrammatic and cross-sectional view of the exhaust nozzle of FIG. 2 showing the inner plug has moved to the axially aft closed position to cause the variable area region of the flow path of the exhaust nozzle to have a convergent-divergent shape to increase an efficiency of the gas turbine engine.

The variable exhaust nozzle 20 includes an outer shroud 22, an inner plug 24, and an actuator controller 26 as shown in FIG. 2. The outer shroud 22 and the inner plug 24 extend circumferentially around the axis 11 and form an exhaust nozzle flow path 15 therebetween through which hot exhaust products from the turbine 18 flow. A variable area region 28 of the exhaust nozzle flow path 15 is defined by the outer shroud 22 and the inner plug 24 as shown in FIGS. 3 and 4 and discussed in further detail below. The inner plug 24 is configured to move relative to the outer shroud 22 between a plurality of positions to change an arrangement of the variable exhaust nozzle 20 to cause the variable area region 28 to move between a convergent nozzle to a convergent-divergent nozzle as suggested in FIGS. 2-4.

Illustratively, the inner plug 24 is configured to translate axially along the axis 11 relative to the outer shroud 22. In other embodiments, the outer shroud 22 or both the outer shroud 22 and the inner plug 24 are configured to move, such as, for example, by translating, relative to the axis to adjust the nozzle type of the variable area region 28.

Figure 5A:
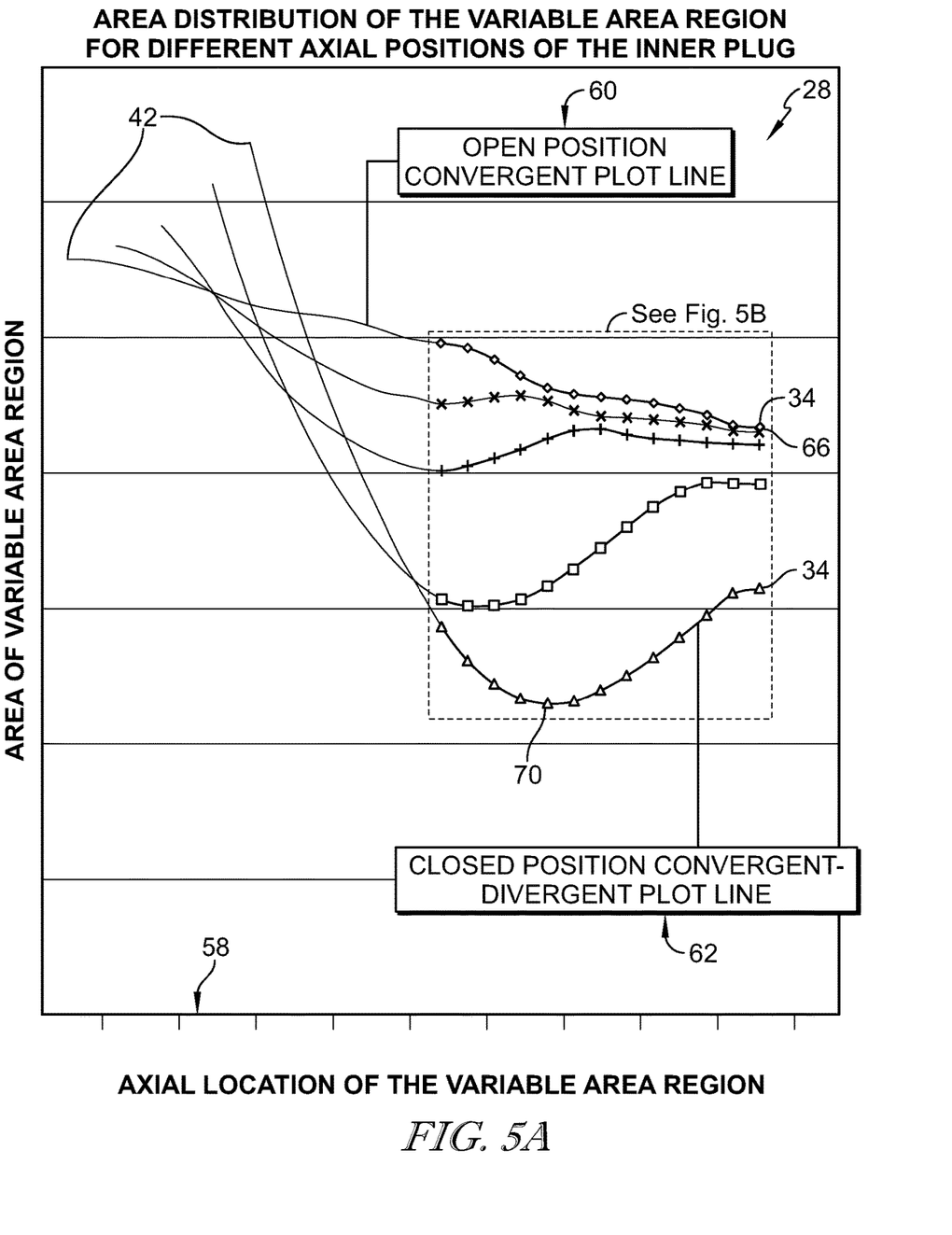
FIG. 5A is a graph showing the cross-sectional area of the variable area region of the flow path of the exhaust nozzle along axial locations of the variable area region for a number of positions of the inner plug relative to the outer shroud including a plot line of the inner plug being in the open position toward the top of the graph, a plot of the inner plug being in the closed position toward the bottom of the graph, and plot lines of a plurality of positions of the inner plug being between the open and closed positions.

When the inner plug 24 is in an axial forward position, it causes the variable area region 28 of the flow path 15 to be convergent as suggested in FIG. 3 and plot line 60 in FIG. 5A and may provide a minimum area sized to be larger than the minimum area when the nozzle is in the convergent-divergent configuration. As such, the area of the variable area region 28 decreases in size as the region extends in the aft direction. This allows for the same or a higher mass flow of exhaust products at a lower speed through the variable exhaust nozzle 20 which may result in lower noise emissions. The lower noise emissions may be helpful for meeting certain noise requirements for ground-level and low-flight level operation such as take-off and landing. As one example, the noise requirements may be related to certain zones around airports such as residential areas. The convergent shape nozzle may also allow for increased engine efficiency for aircraft speeds below Mach 1.0.

When the inner plug 24 is positioned in an axially aft position, it causes the variable area region 28 of the flow path 15 to be convergent-divergent as suggested in FIG. 4 and plot line 62 of FIG. 5A. As such, the area of the variable area region 28 decreases in size to a throat 70 as the variable area region 28 extends in the aft direction and then increases in size aft of the throat 70 as the variable area region 28 extends further aft. The convergent-divergent shape allows for flow acceleration of the exhaust gases and increased engine efficiency, for example, at aircraft speeds above Mach 1.0. The convergent-divergent shape may cause the variable exhaust nozzle 20 to generate noise at greater decibel levels as compared to the convergent shape. As such, the convergent-divergent shape may be used at higher altitudes and/or outside of restricted noise zones.

The outer shroud 22 includes an outer boundary surface 30, a forward axial location 32, and a terminal shroud end 34 that is axially aft of the forward axial location 32 as shown in FIG. 2. The outer shroud 22 extends circumferentially around the axis 11 to form a full hoop and can couple to one of the turbine 18, a bypass duct casing included in the gas turbine engine 10, or another suitable structure. In another embodiment, the outer shroud can form part of one of the turbine casing or the bypass duct casing. The outer shroud 22 extends axially aft and terminates at the terminal shroud end 34. The outer boundary surface 30 forms a portion of the inner surface of the outer shroud 22 and extends axially aft from the forward axial location 32 and terminates at the terminal shroud end 34. The forward axial location 32 is a location axially aft of the turbine 18 and upstream of the terminal shroud end 34.

The outer boundary surface 30 has a profile with a slope that converges radially inward as it extends axially aft from the forward axial location 32 as shown in FIG. 2. The profile of the outer boundary surface 30 creates a larger diameter at the forward axial location 32 and a smallest diameter at the terminal shroud end 34. The outer boundary surface 30 can have varying slope along its axial length. In another embodiment, the outer boundary surface 30 can have a constant slope along its axial length. In some embodiments, the outer boundary surface 30 only converges radially inward from the forward axial location 32 to the terminal shroud end 34 without diverging radially outward as the outer shroud 22 extends aft. The forward axial location 32 may be defined as the axial location of the outer shroud 22 in which the variable area region 28 begins to only converge without diverging again as it extends aft when the inner plug 24 is in the forward open position 60.

The inner plug 24 includes an inner boundary surface 40, a nose 42, a terminal tail end 44, and, illustratively, a probe 46 as shown in FIG. 2. The inner plug 24 extends circumferentially around the axis 11 and can translate axially along the axis 11 to change the shape of the variable area region 28. The probe 46 extends axially along the axis 11 and couples with the nose 42 of the inner plug 24.

The nose 42 is positioned radially and axially in the variable exhaust nozzle 20 to capture the turbulent flow of exhaust gases in the exhaust nozzle flow path 15 as shown in FIG. 2. Geometric features and components of the gas turbine engine 10 positioned forward of the nose 42 can create vortices and turbulent air in the variable exhaust nozzle 20 that can redirect the air inward toward the axis 11. The nose 42 is positioned relative to these features to capture the vortices and direct them over the inner boundary surface 40 of the inner plug 24 to be used by the variable exhaust nozzle 20.

In some embodiments, the nose 42 is the most forward axial point of the inner plug 24. In other embodiments, the nose 42 is located at the interface of the inner boundary surface 40 and the probe 46. The nose 42 of the inner plug 24 is aligned axially with or axially aft of the forward axial location 32 of the outer shroud 22 when the inner plug 24 is in the axial forward open position. The terminal tail end 44 of the inner plug 24 is axially aft of the terminal shroud end 34 of the outer shroud 22 in both the axial forward and aft positions of the inner plug 24 in the illustrative embodiment.

The inner boundary surface 40 forms the outer surface of the inner plug 24 and extends axially aft from the nose 42 and terminates at the terminal tail end 44 as shown in FIG. 2. The inner boundary surface 40 has a profile that includes a forward portion 50 and an aft portion 52 that is axially aft of the forward portion 50 as shown in FIGS. 3 and 4. The forward portion 50 extends radially outward and axially aft from the nose 42, with gradually decreasing slope, to a radial maximum height 54 that corresponds to a maximum diameter of the inner plug 24. The forward portion 50 transitions into the aft portion 52 at the radial maximum height 54. The aft portion 52 extends axially aft and radially inward with varying slope until it terminates at the terminal tail end 44. In the illustrative embodiment, the inner plug 24 has a droplet shape.

The variable area region 28 is defined axially between the nose 42 and the terminal shroud end 34 and radially between the inner boundary surface 40 of the inner plug 24 and the outer boundary surface 30 of the outer shroud 22 as shown in FIGS. 3 and 4. As such, the axial length of the variable area region 28 may change in response to the movement of the inner plug 24. As an example, the variable area region 28 has a longer axial length when the inner plug 24 is in the open position shown in FIG. 3 as compared to when the inner plug 24 is in the closed position shown in FIG. 4.

Figure 7:
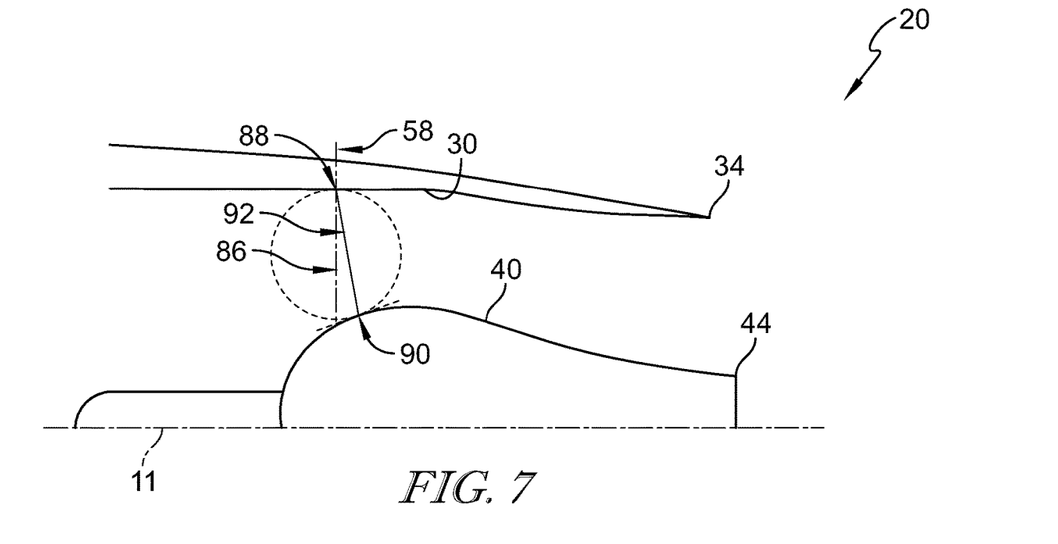
FIG. 7 is a diagrammatic and cross-sectional view of a portion of the exhaust nozzle of FIG. 2 showing the geometry construction lines to establish the smallest distance between the outer shroud and inner plug at a defined axial location, which can be revolved circumferentially around the axis to give the smallest cross-sectional area for the defined axial location.

The variable area region 28 has different areas along a plurality of axial locations 58 as shown in FIG. 5A. The area of the nozzle at a discrete axial location 58 is calculated as the smallest cross-sectional area bound between the outer boundary surface 30 and the inner boundary surface 40 at that axial location 58. The smallest cross-sectional area for an axial location 58 is calculated by forming a circle with center point 86 aligned to the axial location 58 as shown in FIG. 7. The largest circle for an axial location 58 will have an outer tangent to an outer point 88 on the outer boundary surface 30 and an inner tangent to an inner point 90 on the inner boundary surface 40. The distance between the inner point 90 and the outer point 88 represents the smallest distance between the outer boundary surface 30 and the inner boundary surface 40 for the axial location 58 being calculated. A line 92 connecting the outer point 88 and the inner point 90 is revolved circumferentially around the axis to give an annulus shape with smallest cross-sectional area for the axial location 58.

The variable area region 28 has different area distributions depending on the axial translation position of the inner plug 24 relative to the outer shroud 22 as shown in FIG. 5A. As discussed above, the variable area region 28 has a convergent shape when the inner plug 24 is in the axially forward open position as designated by plot line 60 and has a convergent-divergent shape when the inner plug 24 is in the axially aft closed position as designated by plot line 62 in FIG. 5A. The variable area region 28 has a plurality of other shapes achieved by moving the inner plug 24 between the open position and the closed position.

The inner plug 24 may be held in a fixed position relative to the outer shroud 22 in any of the plurality of positions to achieve a desired noise or efficiency for the engine 10. Even still, the inner plug 24 may be blocked from being held in fixed position in some positions by the actuator controller 26 as discussed below to avoid damage to the variable exhaust nozzle 20. The inner plug 24 may be moved faster through certain positions as compared to other positions to avoid damage.

The variable area region 28 has a convergent-divergent shape when the inner plug 24 is axially aft in a closed position 62 shown in FIG. 4. The convergent-divergent shape may be more efficient than other shapes and may also generate greater noise than other shapes such as, for example, the open convergent shape shown in FIG. 3. The inner plug 24 is free to move between a plurality of positions 64 axially between the open position 60 and the closed position 62 that result in a nozzle shape of the variable area region 28 to transition between a convergent and convergent-divergent shape as shown in FIG. 5A.

In some embodiments, the actuator controller 26 blocks the inner plug 24 from being stopped and held in position in some of the plurality of positions 64 to reduce damage and wear to the variable exhaust nozzle 20 caused by dynamic responses that occur when the inner plug is in certain positions. In other embodiments, the actuator controller 26 is configured to block the inner plug 24 and hold it in position in any of the plurality of positions 64. The plurality of positions 64 may include a preset and finite number of positions or may include a continuous infinite number of positions. In some embodiments, the actuator controller 26 moves the inner plug 24 faster through some of the plurality of positions 64 to reduce damage and wear to the variable exhaust nozzle 20 caused by dynamic responses that occur when the inner plug is in certain positions.

The open position 60 is provided when the inner plug 24 is in its most forward axial position relative to the outer shroud 22 as shown in FIG. 3. The open position 60 results in a convergent shape of the variable area region 28 with gradually decreasing nozzle area as the variable area region 28 extends axially aft as suggested in FIG. 5A. The open position 60 has an open position throat 66 located at the terminal shroud end 34 of the variable exhaust nozzle 20. The open position throat 66 corresponds to a smallest area of the variable area region 28 for the open position 60. The open position throat 66 is aligned to the most axially aft axial location 58 of the variable area region 28. A maximum area of the nozzle in the open position 60 is at the forward most axial location 58 of the variable area region 28. The open position 60 also results in the largest overall area of the variable exhaust nozzle 20 which allows for larger mass flow of air at lower speeds. This reduces noise emissions of the engine and can be used for ground-level and low-altitude level operation where noise restrictions may apply.

The closed position 62 is provided when the inner plug 24 is in its most axially aft position relative to the outer shroud 22 as shown in FIG. 4. The closed position 62 results in a convergent-divergent shape of the variable area region 28 as suggested in FIG. 5A. The variable area region 28 in the closed position 62 initially decreases to a closed position throat 70 as the variable area region extends axially aft from the nose 42. The variable area region 28 of the closed position 62 diverges as it extends axially aft of the closed position throat 70 and continues to diverge towards the terminal shroud end 34. The closed position throat 70 corresponds to the smallest area of the variable area region 28 for the closed position 62. The maximum area of the variable area region 28 of the closed position 62 may be aligned to the terminal shroud end 34 or the nose 42. The convergent-divergent nozzle shape allows the exhaust gases to accelerate as the gases pass through the closed position throat 70. This may improve efficiency of the gas turbine engine 10 at high speeds such as, for example, above Mach 1.0.

Figure 5B:
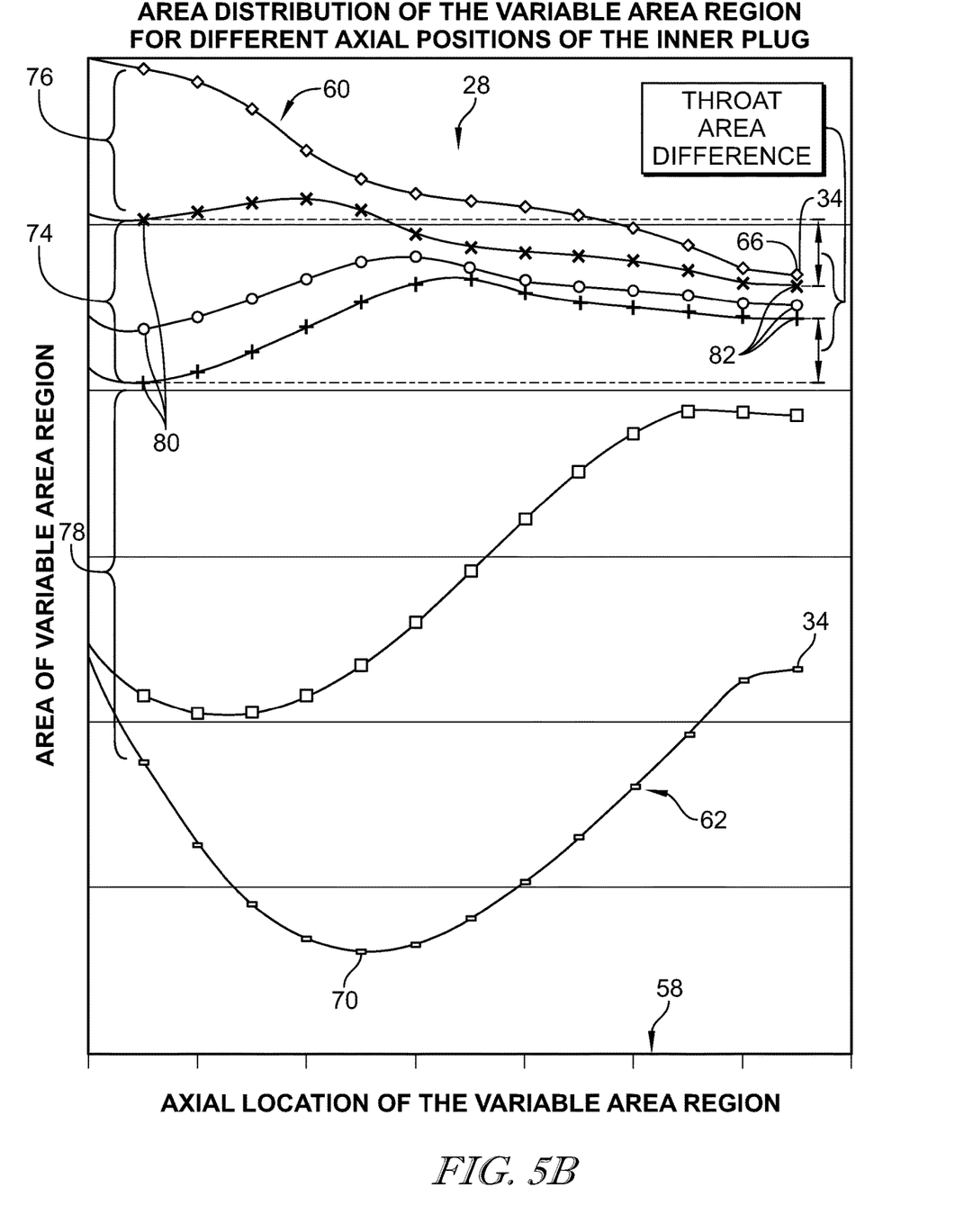
FIG. 5B is a graph showing an enlarged area distribution plots of the variable area region of the exhaust nozzle flow path of FIG. 5A for some of the plurality of positions of the inner plug and further showing that the first plurality of positions includes a forward range of positions represented between the two topmost plot lines and an aft range of positions represented between the bottom three plot lines, and the second plurality of positions is located between the forward range and the aft range as represented by the plot line located between the forward and aft ranges.
Figure 6:
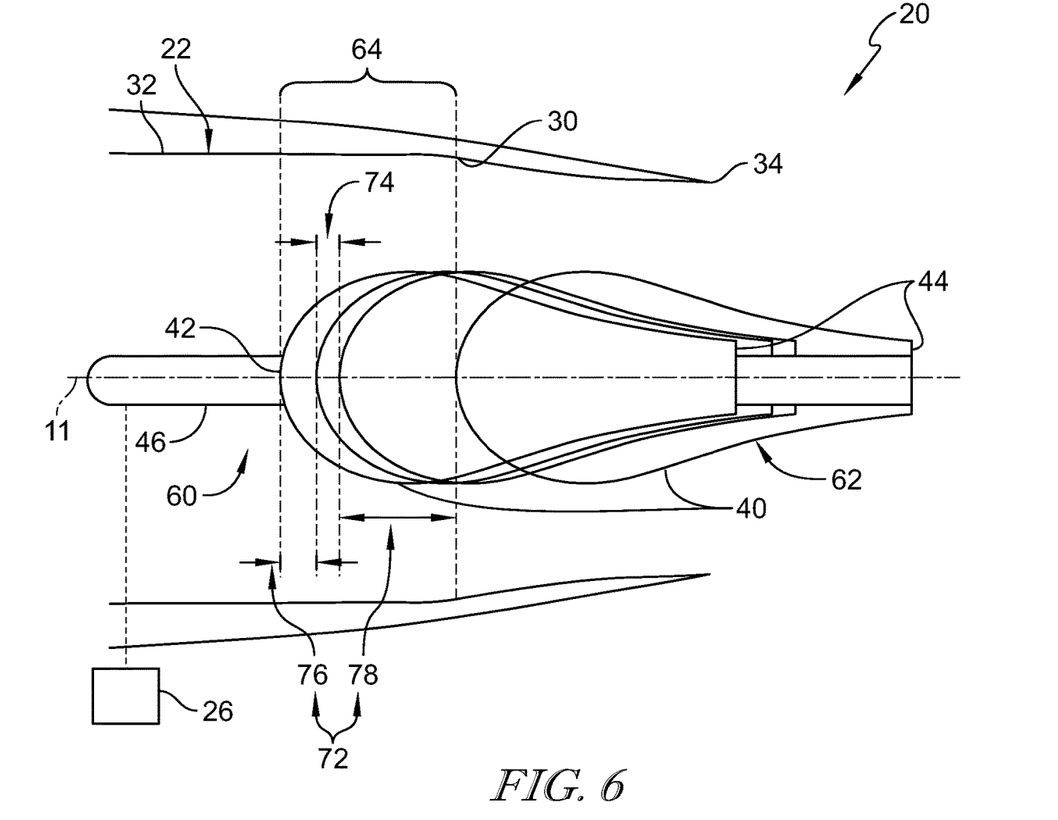
FIG. 6 is a diagrammatic and cross-sectional view of the exhaust nozzle of FIG. 2 showing that the inner plug can be translated axially through a plurality of positions that includes a first plurality of positions in which the inner plug can be held in fixed position and a second plurality of positions in which the inner plug may move through, but is not held in fixed position to avoid and minimize damage and wear to the exhaust nozzle due to potential or actual aerodynamic buzz.

In the illustrative embodiment, the plurality of positions 64 of the inner plug 24 includes a first plurality of positions 72 and a second plurality of positions 74 that define ranges of axial translation of the inner plug 24 relative to the outer shroud 22 as suggested in FIGS. 5B and 6. The plurality of positions 64 result in different shapes of the variable area region 28 that may be convergent, convergent-divergent, or a transitional shape between convergent and convergent-divergent.

The actuator controller 26 is configured to move the inner plug 24 through the first plurality of positions 72 and the second plurality of positions 74. In the illustrative embodiment, the actuator controller 26 is further configured to stop and hold the inner plug 24 in any of the first plurality of positions 72 and blocked from stopping the inner plug 24 in any of the second plurality of positions 74. The actuator controller 26 may be blocked from stopping and holding the inner plug 24 by mechanical or software features.

Illustratively, the inner plug 24 is blocked from being held in any of the second plurality of positions 74 because the variable exhaust nozzle 20 may produce a dynamic response that may damage the variable exhaust nozzle 20 when the inner plug 24 is in the second plurality of positions 74. In some embodiments, the dynamic response is caused by two throats of similar size being formed in the variable exhaust nozzle 20 that cause a response to cycle back and forth axially between the two similar sized throats.

In some embodiments, the speed at which the inner plug 24 is moved is increased as it is moved through the second plurality of positions 74 to reduce an amount of time spent in those positions. In other embodiments, the actuator controller 26 does not block the inner plug 24 from being held in position in any of the second plurality of positions. In some embodiments, the speed of movement for the inner plug 24 is a set speed for moving through all positions and the set speed is determined based on a desired speed for moving through the second plurality of positions 74.

In the illustrative embodiment, the first plurality of positions 72 includes a forward subset of positions 76 and an aft subset of positions 78 as shown in FIGS. 5B and 6. The forward subset of positions 76 include a range of axial translation positions of the inner plug 24 relative to the outer shroud 22 and are located axially forward of the aft subset of positions 78. The forward subset of positions 76 include the open position 60 at the forward most axial translation position for the forward subset of positions 76. The aft subset of positions 78 includes the closed position 62.

The shape of variable area region 28 of the forward subset of positions 72 is generally convergent, however, as the inner plug 24 translates axially aft relative to the outer shroud 22, the area at the nose 42 may decrease quicker than other axial locations 58 giving the variable area region 28 a different shape. As the shape of the variable area region 28 changes, the throat may shift between one of a first area position 80 and a second area position 82 at the terminal shroud end 34. The second plurality of positions 74 are defined by the occurrence of the area of the first area positon 80 and the area of the second area position 82 being equal to or less than a predetermined percent value.

The forward subset of positions 76 is defined by the occurrence of the areas of the first area position 80 and the second area position 82 being greater than the predetermined percent value. The predetermined percent value is based on a determination that the sonic area would form alternatively between the first area position 80 and the second area position 82 (jumping back and forth or buzzing between the two locations) causing high dynamic stress and possibly damaging the variable exhaust nozzle 20. The predetermined percent value may change depending on the exact design and shape that the variable exhaust nozzle 20 takes.

In the illustrative embodiment, the predetermined percent value is about 2 percent. As such, the second plurality of positions 74 are defined by positions of the inner plug 24 which cause the first area position 80 and the second area position 82 to be within about 2 percent area of each other.

In some embodiments, the predetermined percent value is about 5 percent. In some embodiments, the predetermined percent value is about 4 percent. In some embodiments, the predetermined percent value is about 3 percent. In some embodiments, the predetermined percent value is about 1.9 percent. In some embodiments, the predetermined percent value is about 1.8 percent. In some embodiments, the predetermined percent value is about 1.7 percent. In some embodiments, the predetermined percent value is about 1.6 percent. In some embodiments, the predetermined percent value is about 1.5 percent. In some embodiments, the predetermined percent value is about 1.4 percent. In some embodiments, the predetermined percent value is about 1.3 percent. In some embodiments, the predetermined percent value is about 1.2 percent. In some embodiments, the predetermined percent value is about 1.1 percent. In some embodiments, the predetermined percent value is about 1.0 percent.

In some embodiments, the predetermined percent value is about 0.9 percent. In some embodiments, the predetermined percent value is about 0.8 percent. In some embodiments, the predetermined percent value is about 0.7 percent. In some embodiments, the predetermined percent value is about 0.6 percent. In some embodiments, the predetermined percent value is about 0.5 percent. In some embodiments, the predetermined percent value is about 0.4 percent. In some embodiments, the predetermined percent value is about 0.3 percent. In some embodiments, the predetermined percent value is about 0.2 percent. In some embodiments, the predetermined percent value is about 0.1 percent.

In some embodiments, the predetermined percent value is between about 5 and 0.5 percent. In some embodiments, the predetermined percent value is between about 4 and 0.5 percent. In some embodiments, the predetermined percent value is between about 3 and 0.5 percent. In some embodiments, the predetermined percent value is between about 2 and 0.5 percent. In some embodiments, the predetermined percent value is between about 2 and 0.75 percent. In some embodiments, the predetermined percent value is between about 2 and 0.9 percent. In some embodiments, the predetermined percent value is between about 2 and 1.0 percent. In some embodiments, the predetermined percent value is between about 1.9 and 0.5 percent. In some embodiments, the predetermined percent value is between about 1.75 and 0.5 percent. In some embodiments, the predetermined percent value is between about 1.5 and 0.5 percent. In some embodiments, the predetermined percent value is between about 1.0 and 0.5 percent. In some embodiments, the predetermined percent value is between about 3 and 1.0 percent. In some embodiments, the predetermined percent value is between about 3 and 2.0 percent.

The aft subset of positions 78 are a range of axial translation positions of the inner plug 24 relative to the outer shroud 22 and are located axially aft of the forward subset of positions 76 as shown in FIG. 6. The aft subset of positions 78 include the closed position 62 at the aft most axial translation position for the aft subset of positions 78. Therefore, the shape of the variable area region 28 at the aft most axial translation position for the aft subset of positions 78 is convergent-divergent with smallest area at the closed position throat 70. The shape of the variable area region 28 includes a closed position throat 70.

The aft subset of positions 78 are located aft of the second plurality of positions 74 as suggested in FIGS. 5B and 6. The predetermined percent value may be the same value for transitioning from the forward subset of positions 76 to the second plurality of positions 74 as it is for transitioning from the second plurality of positions 74 to the aft subset of positions 78. In other embodiments, the predetermined percent value is different for the two different transitions.

The second plurality of positions 74 is located axially aft of the forward subset of positions 76 and axially forward of the aft subset of positions 78 of the first plurality of positions 72 in the illustrative embodiment as shown in FIG. 6. In other embodiments, the second plurality of positions 74 may be entirely forward of the first plurality of positions 72 or entirely aft of the first plurality of positions 72. In some embodiments, the second plurality of positions 74 includes 2 or more ranges of positions that are separated by intermediate subsets included in the first plurality of positions 72.

In at least some of the axial translation position of the second plurality of positions 74, the variable area region 28 includes a first area position 80 and a second area position 82 with areas that are within the predetermined percent value as suggested in FIGS. 5B and 6. Two or more similar throat areas axially spaced apart can cause a sonic flow to jump between the two or more axial throat locations. A cycle of the sonic flow jumping from the first area position 80 to the second area position 82, and back again from the second area position 82 to the first area position 80 can cause high cycle fatigue in the inner plug 24, the outer shroud 22, and other neighboring components of the gas turbine engine 10. A variable exhaust nozzle 20 can be designed to endure a cycle limit during engine operation of the sonic flow jumping between throat locations.

The actuator controller 26 includes a processor and an actuator device that axially translates the inner plug 24 relative to the outer shroud 22. The processor provides an electrical signal to the actuator device that results in the actuator device axially translating the inner plug 24 forward or aft into the open position 60, the closed position 62, or one of the plurality of positions 64.

The actuator controller 26 is configured to receive a first input that corresponds to a take-off mode. Upon receiving the first input, the processor provides an electronic signal to the actuator device to move the inner plug 24 axially forward to the open position 60. The actuator controller 26 holds the inner plug 24 in this position until a different input is received. The actuator controller 26 can receive a second input that corresponds to a cruise mode and causes the processor to provide a signal to the actuator device to translate the inner plug axially aft to the closed position 62. The actuator controller 26 holds the inner plug 24 in this position until a different input is received.

The actuator controller 26 may receive input to hold and stop the inner plug 24 in one of the first plurality of positions 72 including the open position 60 or the closed position 62. In some embodiments, it might be advantageous to hold the inner plug 24 relative to the outer shroud 22 in other axial translation positions within the first plurality of positions 72 to tune the variable exhaust nozzle 20 for a certain point in the engine cycle or an aircraft maneuver. The actuator controller 26 prevents the inner plug 24 from being held in the second plurality of positions 74 in the illustrative embodiment. The actuator controller 26 may translate the inner plug 24 at a predetermined speed within the first plurality of positions 72. When actuator controller 26 has to translate the inner plug 24 through the second plurality of positions 74, a speed can be selected that is higher than the predetermined speed. This may reduce the number of cycles experienced by the variable exhaust nozzle 20 to stay within the cycle limit.

The higher predetermined speed is calculated based on a total number of cycles that would fail the variable exhaust nozzle 20, the total number of transitions through the second plurality of positions 74 expected to be made by the inner plug 24 during a life of the variable exhaust nozzle 20, the number of cycles experienced at different speeds of the inner plug 24 passing through the positions 76, and desired factors of safety. As an example, a nozzle is tested and is determined that a limit of number of cycles causes the nozzle to fail. The speed for moving the inner plug 24 through the positions 74 may be determined such that the number of cycles experienced by the nozzle during each transition through positions 74 multiplied by the total number of transitions throughout the life of the nozzle is less than the limit of number of cycles with some desired factor of safety for the values.

In some embodiments, the actuator controller 26 responds to a failure input from the gas turbine engine 10 and provides a signal to the actuator device to move the inner plug 24 into the open position 60. In other embodiments, the variable exhaust nozzle 20 is designed to mechanically default to the open position 60 in a mechanical failure scenario of the translating device. In other embodiments, the variable exhaust nozzle 20 is designed to mechanically default to the closed position 62 in a mechanical failure scenario of the translating device.

Supersonic aircraft may be designed to satisfy stringent FAA noise requirements while still performing efficiently at high Mach flight speeds. To satisfy the noise requirements, the jet flow of the exhaust nozzle flow path 15 should remain in the subsonic regime during takeoff, which lends itself towards a convergent nozzle design. However, in flight at high nozzle pressure ratios, a nozzle with a convergent-divergent design is more efficient. The present application solves this problem so that the nozzle can be convergent at takeoff but convergent-divergent during flight. This is achieved by carefully constructing the aerodynamic lines of outer boundary surface 30 and the inner boundary surface 40 of the variable exhaust nozzle 20 and by shifting an inner plug 24 to adjust nozzle areas.

FIG. 3 shows the nozzle in the open position 60. This allows for a purely convergent nozzle as shown in FIG. 5, which results in much slower air than a convergent-divergent nozzle would. The resulting maximum Mach number with a purely convergent nozzle at takeoff flight conditions is estimated to be fully subsonic from the reduced engine operation line. This Mach number greatly reduces the risk of violating noise requirements.

A reheat system may not be an option with the Stage 5 noise requirements. A convergent area progression at takeoff may allow the variable exhaust nozzle 20 to maintain subsonic jet velocities and satisfy noise requirements. Once the aircraft is far enough away from the noise requirement areas, the system may adjust to a convergent-divergent area progression to improve SFC and increase range.

Supersonic aircrafts, such as those used in civil markets, may be designed for supersonic cruise speeds and may be designed to satisfy noise requirements at takeoff. A variable nozzle may be desired so that flow can be slowed down at takeoff, but accelerated at forward flight conditions. Such a nozzle may use two area distributions; a convergent nozzle at takeoff as shown in FIG. 3 and a convergent-divergent nozzle at cruise as shown in FIG. 4.

During the transition between convergent to convergent-divergent, there are opportunities for two throat areas 80, 82 to form over an axial distance as shown in FIG. 5B. This may cause the sonic area to jump back and forth, or buzz, between the two throat locations 80, 82 causing high dynamic stresses and potentially failure. The transient area distributions may be designed so that there is no extended period for this buzzing opportunity. This then allows an actuator controller 26 to be designed that will further mitigate time spent in these keep out zones.

In some embodiments, area distributions with two throats 80, 82 within 2 percent area, offset by an axial distance, define keep-out zones or the second plurality of positions 74. In other embodiments, 1 percent and 0.5 percent throat areas may also determine the keep-out zones. In other embodiments, other predetermined percent throat area values may also determine the keep-out zones.

FIG. 5B shows area distributions at different variable exhaust nozzle 20 axial translations. The top line is equivalent to the open position 60, in which the inner plug 24 is all the way forward, and the bottom line is equivalent to the closed position 62, where the inner plug 24 is all the way aft. At the third line from the top, there are two throats 80, 82 that may form near the leading and trailing parts of the area distributions. This may represent the keep-out zone or second plurality of positions 74 that the inner plug 24 is designed to translate through quickly. In order to give the variable exhaust nozzle 20 margin and mitigate the risk of buzz, the keep-out zone may be extended axially some distance in either direction.

Aerodynamic buzz may not be an issue for existing variable area nozzle aircraft because existing variable exhaust nozzles do not change from a convergent to a convergent-divergent area progression. However, the nozzle of the present disclosure may be helpful for achieving modern noise requirements. The risk of aerodynamic buzz may be minimized by understanding the area progression of the variable exhaust nozzle 20, minimizing the time spent in the keep-out zones, and reinforcing the areas of the nozzle that are expected to experience buzz.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A variable exhaust nozzle for a gas turbine engine, the variable exhaust nozzle comprising
    an outer shroud arranged circumferentially about an axis and fixed relative to the axis to define an outer boundary surface of an exhaust nozzle flow path, the outer shroud extends axially between a forward axial location and a terminal shroud end, and the outer boundary surface decreases in diameter without any portion of the outer boundary surface extending radially outward away from the axis as the outer shroud extends axially aft from the forward axial location to the terminal shroud end, and
    an inner plug arranged circumferentially about the axis to define an inner boundary surface of the exhaust nozzle flow path, the inner plug extends axially between a nose and a terminal tail end, and the inner boundary surface increases in diameter to a maximum diameter and then decreases in diameter as the inner plug extends axially aft from the nose to the terminal tail end,
    wherein a variable area region of the exhaust nozzle flow path is defined axially between the nose of the inner plug and the terminal shroud end and defined radially between the outer boundary surface and the inner boundary surface, and
    wherein the inner plug is configured to translate axially relative to the outer shroud between an open position in which the outer boundary surface and the inner boundary surface cooperate to cause the variable area region of the exhaust nozzle flow path to converge in area to a first throat located aft of the maximum diameter at the terminal shroud end without diverging in area and a closed position in which the outer boundary surface and the inner boundary surface cooperate to cause the variable area region of the exhaust nozzle flow path to converge in area to a second throat and then diverge in area aft of the second throat, and the second throat is spaced apart axially from the nose of the inner plug and the terminal shroud end.

2. The variable exhaust nozzle of claim 1, wherein the terminal tail end is located axially aft of the terminal shroud end when the inner plug is in the open position.

3. The variable exhaust nozzle of claim 2, wherein the nose of the inner plug is located axially forward of the terminal shroud end when the inner plug is in the open position and when the inner plug is in the closed position.

4. The variable exhaust nozzle of claim 1, wherein a minimum area of the variable area region when the inner plug is in the open position is greater than a minimum area of the variable area region when the the inner plug is in the closed position.

5. The variable exhaust nozzle of claim 1, wherein the variable area region of the exhaust nozzle flow path diverges in area aft of the second throat without converging in area aft of the second throat.

6. The variable exhaust nozzle of claim 1, wherein the inner plug is movable relative to the axis between a plurality of positions between the open position and the closed position and the variable exhaust nozzle further comprises an actuation controller configured to selectively move the inner plug and to stop and hold the inner plug relative to the axis in the open position, the closed position, and at least one of the plurality of positions.

7. The variable exhaust nozzle of claim 6, wherein the inner plug is configured to default to one of the open position and the closed position in response to failure of the actuation controller.

8. The variable exhaust nozzle of claim 6, wherein the actuation controller is configured to receive a first input indicative that the gas turbine engine is in a take-off mode and to move the inner plug to the open position in response to receiving the first input and the actuation controller is configured to receive a second input indicative that the gas turbine engine is in a cruise mode and to move the inner plug to the closed position in response to receiving the second input.

9. The variable exhaust nozzle of claim 1, wherein the inner plug has a profile which is convex axially between the nose and the maximum diameter of the inner plug and concave axially between the maximum diameter and the terminal tail end, wherein the terminal tail end of the outer shroud is located aft of the maximum diameter in both the open position and the closed position.

10. A variable exhaust nozzle comprising
  an outer shroud arranged circumferentially about an axis, the outer shroud having a terminal shroud end, and
  an inner plug arranged circumferentially about the axis, the inner plug extends axially between a nose and a tail, the inner plug and the outer shroud cooperate to form an exhaust nozzle flow path having a variable area region defined axially between the nose of the inner plug and the terminal shroud end of the outer shroud, the inner plug having a maximum diameter located axially between the nose and the tail,
  wherein at least one of the outer shroud and the inner plug is movable relative to the axis between a first position in which the variable area region converges in area to a throat located aft of the maximum diameter of the inner plug without diverging in area, a second position in which the variable area region converges and then diverges in area, and a plurality of positions between the first position and the second position.

11. The variable exhaust nozzle of claim 10, wherein the at least one of the outer shroud and the inner plug is movable relative to the axis between a plurality of positions between the first position and the second position and the variable exhaust nozzle further comprises an actuation controller configured to selectively move the at least one of the outer shroud and the inner plug and to stop and hold the at least one of the outer shroud and the inner plug relative to the axis.

12. The variable exhaust nozzle of claim 11, wherein the at least one of the outer shroud and the inner plug is configured to default to one of the first position and the second position in response to failure of the actuation controller.

13. The variable exhaust nozzle of claim 10, wherein the inner plug has a profile which is convex axially between the nose and the maximum diameter of the inner plug and concave axially between the maximum diameter and the tail.

14. The variable exhaust nozzle of claim 10, wherein the outer shroud defines an outer boundary surface of the exhaust nozzle flow path, the outer shroud extends axially between a forward axial location and a terminal shroud end, and the outer boundary surface decreases in diameter as the outer shroud extends axially aft from the forward axial location to the terminal shroud end such that the outer boundary surface does not include any portion that extends radially outward away from the axis.

15. The variable exhaust nozzle of claim 10, wherein the inner plug arranged circumferentially about the axis to define an inner boundary surface of the exhaust nozzle flow path, the inner plug extends axially between a nose and a terminal tail end, and the inner boundary surface increases in diameter and then decreases in diameter as the inner plug extends axially aft from the nose to the terminal tail end.

16. The variable exhaust nozzle of claim 10, further comprising an actuation controller configured to move the at least one of the outer shroud and the inner plug, the actuation controller is further configured to receive a first input indicative that a gas turbine engine is in a take-off mode and to move the at least one of the outer shroud and the inner plug to the first position in response to receiving the first input, and the actuation controller is further configured to receive a second input indicative that the gas turbine engine is in a cruise mode and to move the at least one of the outer shroud and the inner plug to the second position in response to receiving the second input.

17. The variable exhaust nozzle of claim 10, wherein a minimum area of the variable area region when the at least one of the outer shroud and the inner plug is in the first position is greater than a minimum area of the variable area region when the at least one of the outer shroud and the inner plug is in the second position.

18. A method comprising
  providing an inner plug arranged circumferentially about an axis and a single outer shroud arranged circumferentially about the inner plug, the outer shroud having a terminal shroud end, and the inner plug extending axially between a nose and a tail, the inner plug having a profile which is convex axially between the nose and a maximum diameter of the inner plug and concave between the maximum diameter and the tail, the inner plug and the outer shroud cooperating to form an exhaust nozzle flow path having a variable area region defined axially between the nose of the inner plug and the terminal shroud end of the outer shroud,
  moving at least one of the outer shroud and the inner plug relative to the axis to a first position in which the variable area region converges in area to a first throat located aft of the maximum diameter at the terminal shroud end without diverging in area, and
  moving the at least one of the outer shroud and the inner plug relative to the axis to a second position in which the variable area region converges and then diverges in area.

19. The method of claim 18, further comprising providing an actuator controller configured to move the at least one of the outer shroud and the inner plug relative to the axis between the first position and the second position and further comprising moving the at least one of the outer shroud and the inner plug relative to the axis to one of the first position and the second position in response to a failure of the actuator controller.

20. The method of claim 18, further comprising providing an actuator controller configured to move the at least one of the outer shroud and the inner plug relative to the axis between the first position and the second position, receiving a first input with the actuator controller indicative of a take-off mode of a gas turbine engine, moving the at least one of the outer shroud and the inner plug relative to the axis to the first position in response to receiving the first input, receiving a second input with the actuator controller indicative of a cruise mode of the gas turbine engine, and moving the at least one of the outer shroud and the inner plug relative to the axis to the second position in response to receiving the second input.

\* \* \* \* \*